US011962919B2

United States Patent
Faingersh et al.

(10) Patent No.: US 11,962,919 B2
(45) Date of Patent: Apr. 16, 2024

(54) APPARATUS AND SYSTEM OF ANALOG PIXEL BINNING

(71) Applicant: TOWER SEMICONDUCTOR LTD., Migdal Haemek (IL)

(72) Inventors: Alexander Faingersh, Netaniya (IL); Vered Antebi, Modiin (IL); Raz Reshef, Netaniya (IL)

(73) Assignee: TOWER SEMICONDUCTOR LTD., Migdal Haemek (IL)

( * ) Notice: Subject to any disclaimer, the term of this patent is extended or adjusted under 35 U.S.C. 154(b) by 0 days.

(21) Appl. No.: 17/871,960

(22) Filed: Jul. 24, 2022

(65) Prior Publication Data

US 2024/0031693 A1  Jan. 25, 2024

(51) Int. Cl.
*H04N 25/46* (2023.01)
*H04N 25/70* (2023.01)

(52) U.S. Cl.
CPC ............. *H04N 25/46* (2023.01); *H04N 25/70* (2023.01)

(58) Field of Classification Search
CPC ........ H04N 25/46; H04N 25/75; H04N 25/70; H04N 25/77; H04N 25/771; H04N 25/40; H01L 27/14609; H01L 27/14641
See application file for complete search history.

(56) References Cited

U.S. PATENT DOCUMENTS

| | | | |
|---|---|---|---|
| 2001/0008420 A1* | 7/2001 | Opris | H04N 25/75 348/E5.079 |
| 2006/0108506 A1* | 5/2006 | Yang | H04N 3/1562 348/E3.02 |
| 2012/0194720 A1* | 8/2012 | Bowers | H04N 25/46 348/E5.091 |
| 2013/0163716 A1* | 6/2013 | Okada | A61B 6/502 378/19 |
| 2014/0354866 A1* | 12/2014 | Yoo | H04N 25/46 348/308 |
| 2017/0163920 A1* | 6/2017 | Hwang | H04N 25/46 |
| 2018/0364373 A1* | 12/2018 | Hondongwa | G01T 1/2018 |
| 2021/0185250 A1* | 6/2021 | Moue | H04N 25/75 |

FOREIGN PATENT DOCUMENTS

KR  10-2015-0138078  12/2015
WO  2005/050977  6/2005

\* cited by examiner

*Primary Examiner* — Jennifer D Bennett
*Assistant Examiner* — Erin R Garber
(74) *Attorney, Agent, or Firm* — Shichrur & Co.

(57) ABSTRACT

For example, analog pixel circuitry may include a first input to input an analog pixel signal of the pixel; Sample and Hold (SH) circuitry to provide an analog sample of the pixel based on the analog pixel signal; one or more second inputs to input analog samples of one or more binning pixels, respectively; a plurality of capacitors having capacitor outputs connected to a common output terminal, wherein a capacitor input of a first capacitor is connected to an input terminal to input the analog sample of the pixel from the SH circuitry, wherein capacitor inputs of one or more second capacitors are connected to the one or more second inputs, respectively; and an amplifier configured to provide an amplified analog signal by amplifying an analog signal from the common output terminal.

20 Claims, 4 Drawing Sheets

APPARATUS AND SYSTEM OF ANALOG PIXEL BINNING

TECHNICAL FIELD

Aspects described herein generally relate to analog pixel binning.

BACKGROUND

An imaging device, e.g., a camera, may include an image sensor to capture one or more images, photos, videos, and/or the like.

The image sensor may include a pixel array including a plurality of pixels.

Some imaging devices may utilize a binning mechanism for binning of a group of neighbor pixels, for example, by averaging pixel information of the group of neighbor pixels. For example, the binning mechanism may be implemented to reduce read data, to increase a Frame Per Second (FPS) rate of the image sensor, to reduce a power consumption of the image sensor, and/or to smooth gradients of an image provided by the image sensor.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

Some aspects may be used in conjunction with various devices and systems, for example, an electronic device, a computing device, an integrated computing device, an integrated chip, electronic circuitry, a processing device, an electronic device, a processor, a memory device, an imaging device, a digital camera device, a video device, a camera module, a medical imaging device, a mobile computer, a laptop computer, a notebook computer, a tablet computer, a handheld computer, a handheld device, a mobile or portable device, a consumer device, a Smartphone and the like.

The terms "substrate" and/or "wafer", as used herein, may relate to a thin slice of semiconductor material, for example, a silicon crystal, which may be used in fabrication of integrated circuits and/or any other microelectronic devices. For example, the wafer may serve as the substrate for the microelectronic devices, which may be built in and over the wafer.

The term "Integrated Circuit" (IC), as used herein, may relate to a set of one or more electronic circuits on a semiconductor material. For example, an electronic circuit may include electronic components and their interconnectors.

Figure 1:
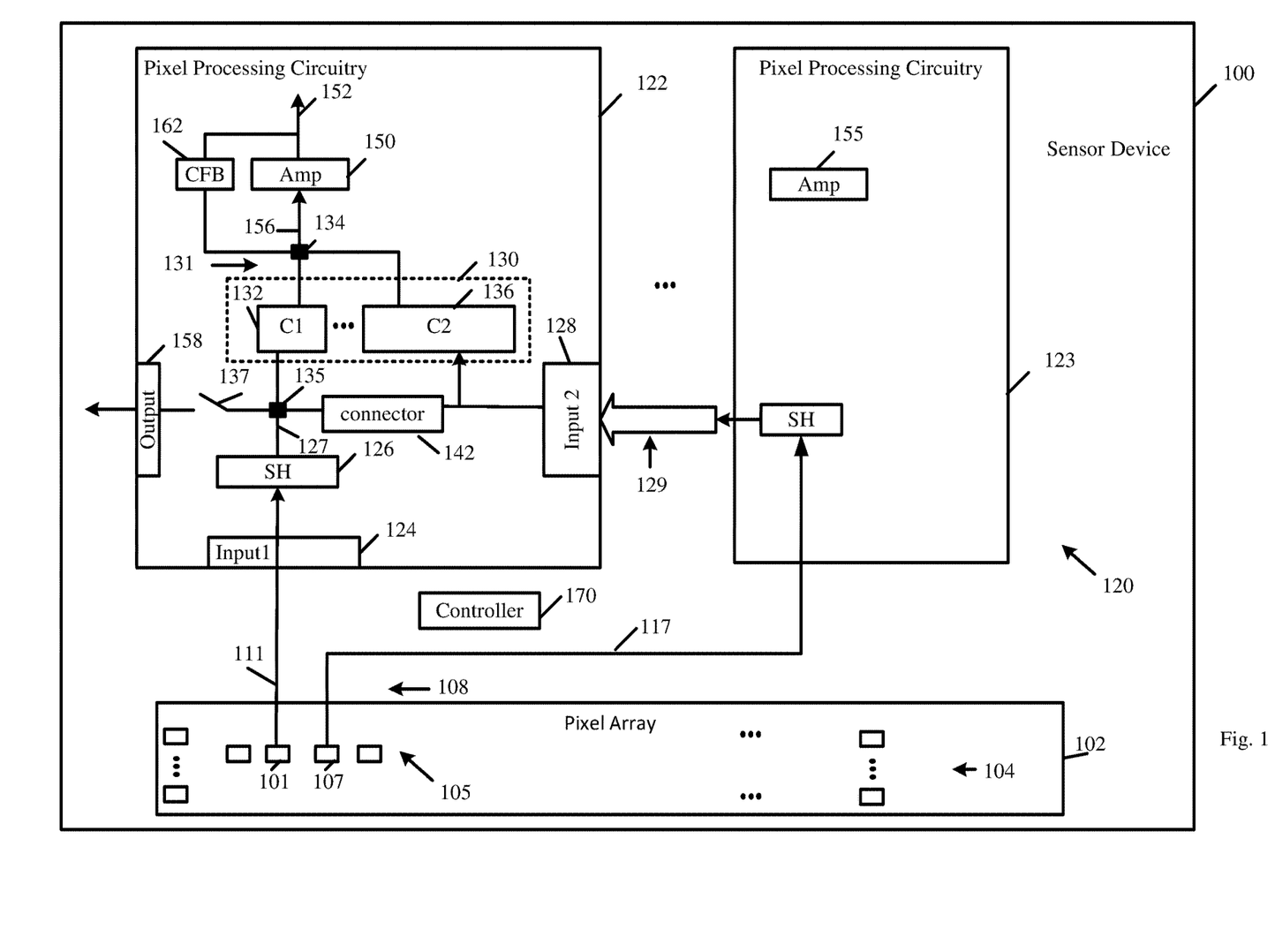
FIG. 1 is a schematic block diagram illustration of a sensor device, in accordance with some demonstrative aspects.

Reference is made to FIG. 1, which schematically illustrates a block diagram of a sensor device 100, in accordance with some demonstrative aspects.

In some demonstrative aspects, sensor device 100 may include and/or may be implemented as an IC.

In some demonstrative aspects, the IC may include a complementary metal-oxide-semiconductor (CMOS) IC formed on a wafer.

In some demonstrative aspects, sensor device 100 may be configured to capture, record, process, handle and/or store one or more images, photos, videos, movies, clips and/or the like.

In one example, sensor device 100 may be included and/or implemented as part of an imaging device, a digital camera, a medical imaging device, and/or the like.

In some demonstrative aspects, sensor device 100 may include a pixel array 102 configured to sense and/or to capture an image.

In some demonstrative aspects, pixel array 102 may be configured to capture photons corresponding to an image, and to convert the photons into electronic signals, for example, to allow sensor device 100 to process the image and/or to output the image, e.g., to a display, a memory and/or a processor.

In some demonstrative aspects, pixel array 102 may include a plurality of pixels 104.

In some demonstrative aspects, a pixel of the plurality of pixels 104, e.g., each pixel of the plurality of pixels 104, may be configured to capture incoming photons at an area of the pixel, and to convert the photons into an analog pixel signal.

In some demonstrative aspects, sensor device 100 may include a plurality of array lines 108 to provide a plurality of analog pixel signals from the plurality of pixels 104 to a plurality of analog pixel processing circuitry 120.

In one example, a pixel 101 of the plurality of pixels 104 may be configured to capture incoming photons at an area of the pixel 101, and to convert the photons into an analog pixel signal 111 to be provided via a first array line 108.

In another example, a pixel 107 of the plurality of pixels 104 may be configured to capture incoming photons at an area of the pixel 107, and to convert the photons into an analog pixel signal 117 to be provided via a second array line 108.

In some demonstrative aspects, the plurality of analog pixel processing circuitry 120 may be configured to perform analog processing of the analog pixel signals from the plurality of pixels 104.

In some demonstrative aspects, sensor device 100 may be configured to provide a technical solution to support binning of pixels belonging to a binning group, e.g., as described below.

In some demonstrative aspects, the binning group may include a plurality of pixels, e.g., a plurality of neighbor pixels and/or any other pixels.

In some demonstrative aspects, binning of pixels in a binning group may include averaging pixel information of the pixels in the binning group.

In some demonstrative aspects, the binning group may be defined and/or configured according to one or more binning criteria, for example, to reduce read data, to increase a Frame Per Second (FPS) rate of the sensor device 100, to reduce a power consumption of the sensor device 100, to smooth gradients of an image provided by sensor device 100, and/or based on any other additional or alternative criteria.

In some demonstrative aspects, sensor device 100 may be configured to support binning of pixels according to an analog binning mechanism, which may be configured, for example, to provide a technical solution to support improved Signal to Noise Ratio (SNR) of analog pixel signals, e.g., as described below.

In one example, assuming two equal analog pixel signals having a same value, denoted S, with a same noise level, denoted $\sigma n$, e.g., each of the pixel signals may be represented by the sum $S+\sigma n$ According to this example, averaging the two equal analog pixel signals may result in a square root reduction of the noise level, e.g., $[2S+\sigma n*sqrt(2)]/2=S+\sigma n/sqrt(2)$.

In one example, the "later" in a processing chain the binning of the pixels is performed, the more noise components in overall SNR that may be reduced.

In another example, the "earlier" in a processing chain the binning of the pixels is performed, the less processing chains may be used. The reduction in the number of processing chains may result in reduced readout data and power consumption.

In some demonstrative aspects, there may be one or more technical inefficiencies, disadvantages, and/or problems in techniques ("inside pixel array binning techniques"), which may be configured to perform the pixel binning within a pixel array. For example, the inside pixel array binning techniques may be configured to perform the pixel binning "as early as possible", for example, before Sample and Hold (SH) circuitry and/or before an analog proccing chain. For example, the inside pixel array binning techniques may be configured to connect a Floating Diffusion (FD) of neighbor pixels.

In one example, the inside pixel array binning techniques may intervene into array layout, and may cause pixel sensitivity degradation, for example, due to increased capacity caused by capacities of one or more additional binning-switches. For example, the increased capacity may enlarge an overall FD capacity, which may reduce a sensitivity of the pixel array.

In another example, although the inside pixel array techniques may be configured to reduce noise of a pixel, Source Follower (SF) noise, and/or a kTC noise of SH circuitry, and/or noise of an analog processing chain may not be reduced.

In some demonstrative aspects, there may be one or more technical inefficiencies, disadvantages, and/or problems in techniques ("digital pixel array binning techniques"), which may be configured to perform the pixel binning post-analog-readout and/or during digital processing, e.g., by digital averaging.

In one example, the digital pixel array binning techniques may be configured to reduce noise of all elements in the processing chain. However, the digital pixel array binning techniques may be configured to read all pixel data, e.g., prior to pixel binning, which may not provide a reduction in the dada readout. As a result, all participating analog chains may work and consume power.

In some demonstrative aspects, there may be one or more technical inefficiencies, disadvantages, and/or problems in techniques ("non-simultaneous pixel array binning techniques"), which may be configured to perform pixel during plurality of different time periods. For example, pixel data of pixels may be saved during different time phases on separate capacitors, e.g., each capacitor may save pixel data in a different time phase. For example, the pixel binning may be performed during an additional time phase, for example, by shorting the capacitors, e.g., to average the data stored by the capacitors.

In one example, the non-simultaneous pixel array binning techniques may not reduce an FPS, e.g., as different time phases may be required for the pixel binning.

In another example, the non-simultaneous pixel array binning techniques may involve an additional transient by an additional control signal.

In some demonstrative aspects, the plurality of analog pixel processing circuitry 120 may be configured according to a pixel binning mechanism, which may be configured to provide a technical solution to support active analog binning (signal averaging), for example, without substantial pixel sensitivity degradation, e.g., as described below.

In some demonstrative aspects, the plurality of analog pixel processing circuitry 120 may be configured according to a pixel binning mechanism, which may be configured to provide a technical solution to support active analog binning, e.g., as described below.

In some demonstrative aspects, the plurality of analog pixel processing circuitry 120 may be configured according to a pixel binning mechanism, which may be configured to provide a technical solution to support improved FPS and/or SNR levels of sensor device 100, for example, compared to a normal mode readout without binning, for example, a full resolution readout, e.g., as described below.

In some demonstrative aspects, the plurality of analog pixel processing circuitry 120 may be configured according to a pixel binning mechanism, which may be configured to provide a technical solution to support active analog binning, for example, after pixel array 102 and prior to some, e.g., most, of analog chain processing elements, e.g., as described below.

In some demonstrative aspects, the plurality of analog pixel processing circuitry 120 may be configured according to a pixel binning mechanism, which may be configured to provide a technical solution to support active analog binning, for example, after sampling of a pixel output of a pixel in pixel array 102, and prior to further analog processing and/or digital processing, e.g., as described below.

In some demonstrative aspects, the plurality of analog pixel processing circuitry 120 may be configured according to a pixel binning mechanism, which may be configured to provide a technical solution to support reduction of sensor output data, for example, by binning, e.g., to a full resolution ratio. Accordingly, the pixel binning mechanism may provide a technical solution to improve frame rate, and/or reduce power consumption, e.g., as described below.

In some demonstrative aspects, the plurality of analog pixel processing circuitry 120 may be configured according to a pixel binning mechanism, which may be configured to provide a technical solution to support active analog binning, for example, at a same phase as an SH phase, for example, without requiring an additional phase in time. Accordingly, the pixel binning mechanism may provide a technical solution to improve frame rate.

In some demonstrative aspects, the plurality of analog pixel processing circuitry 120 may be configured according to a pixel binning mechanism, which may be configured to provide a technical solution to support active analog binning, for example, while activating a reduced number of amplifiers, e.g., a single amplifier, per binning group, e.g., as described below. Accordingly, the pixel binning mechanism may provide a technical solution to reduce power consumption.

In some demonstrative aspects, the plurality of analog pixel processing circuitry 120 may be configured according to a pixel binning mechanism, which may be configured to provide a technical solution to support improved SNR of analog samples of contributors, e.g., some or all contributors, prior to SH circuitry, e.g., as described below.

In one example, the SNR may be improved by about a square root of a number of members in a binning group. For example, the contributors may include a source follower noise inside a pixel, a dark current shot noise, an SH kTC noise and/or any other noise prior to SH circuitry.

In some demonstrative aspects, the plurality of analog pixel processing circuitry 120 may be configured according to a pixel binning mechanism, which may be configured to provide a technical solution to support active analog binning, for example, even without any substantial contribution to FD capacity, for example, without substantial pixel sensitivity degradation, e.g., as described below.

In some demonstrative aspects, the plurality of analog pixel processing circuitry 120 may be configured according to a pixel binning mechanism, which may be configured to provide a technical solution to support active analog binning, which may reduce contribution of an SF noise, a kTC noise, and/or a pixel noise, e.g., to SNR.

In some demonstrative aspects, the plurality of analog pixel processing circuitry 120 may be configured according to a pixel binning mechanism, which may be configured to provide a technical solution to support active analog binning, which may reduce a number of participating analog chains for pixel binning. The reduced number of participating analog chains for pixel binning may result in an improved FPS, and/or a reduced power consumption of sensor device 100.

In some demonstrative aspects, the plurality of analog pixel processing circuitry 120 may be configured according to a pixel binning mechanism, which may be configured to provide a technical solution to support active analog binning during a single phase, e.g., substantially simultaneously, for example, even without a need for other additional phases in time, and/or without FPS degradation.

In some demonstrative aspects, the plurality of analog pixel processing circuitry 120 may be configured according to a pixel binning mechanism, which may be configured to provide a technical solution to support active analog binning, e.g., without a need for additional transient control signals, and/or additional transients during operation of pixel array 102.

In some demonstrative aspects, the plurality of analog pixel processing circuitry 120 may include, for example, a plurality of pixel processing circuitry configured to process pixel signals of pixels belonging to one or more pixel binning groups, e.g., as described below.

In some demonstrative aspects, the plurality of analog pixel processing circuitry 120 may be configured to form, or may be part of, one or more pixel binning groups, which may be configured to perform pixel binning for one or more respective groups of binning pixels, e.g., as described below.

In some demonstrative aspects, the plurality of analog pixel processing circuitry 120 may be implemented in the form of a plurality of binning groups to process pixels of a plurality of respective pixel binning groups, e.g., as described below.

In some demonstrative aspects, a binning group may be configured to provide binning of a plurality of pixels in a pixel binning group. For example, the binning group may be configured to provide an average, e.g., an arithmetic average, a weighted average, and/or any other average or combination, of pixel data of the plurality of binning pixels in the pixel binning group.

In some demonstrative aspects, the plurality of pixel binning groups may include a pixel binning group including two pixels.

In some demonstrative aspects, the plurality of pixel binning groups may include a pixel binning group including four pixels.

In some demonstrative aspects, the plurality of pixel binning groups may include a pixel binning group including eight pixels.

In other aspects, the plurality of pixel binning groups may include any other pixel binning group including any other number of pixels.

In some demonstrative aspects, the plurality of pixel binning groups may include two or more pixel binning groups having a same number of pixels.

In some demonstrative aspects, the plurality of pixel binning groups may include two or more pixel binning groups having different numbers pixels, for example, one or more pixel binning groups including two pixels, one or more pixel binning groups including four pixels, and/or any other pixel binning groups.

In some demonstrative aspects, the plurality of pixel binning groups may include two or more pixel binning groups sharing one or more shared pixels. For example, the plurality of pixel binning groups may include a first pixel binning group including pixel 101 and one or more first other pixels of pixel array 102, and a second pixel binning group including pixel 101 and one or more second other pixels of pixel array, e.g., different from the one or more first other pixels of pixel array.

In some demonstrative aspects, the plurality of pixel binning groups may include two or more separate or independent pixel binning groups including different pluralities of pixels of pixel array 102. For example, the plurality of pixel binning groups may include a first pixel binning group including a plurality of first pixels of array 102, and a second pixel binning group including a plurality second pixels of array 102, e.g., such that none of the plurality of first pixels of array 102 are included in the second pixel binning group, and/or none of the plurality of second pixels of array 102 are included in the first pixel binning group.

In some demonstrative aspects, a pixel binning group may include a plurality of neighbor pixels and/or adjacent pixels, which may be located adjacent to each other in the pixel array. For example, a pixel binning group may include at least one row of two or more pixels, at least one column of two or more pixels, at least one diagonal of two or more pixels, or the like.

In some demonstrative aspects, a pixel binning group may include two or more pixels which are not adjacent to each other.

In other aspects, the plurality of pixel binning groups may include one or more additional or alternative pixel binning groups according to any other definition, arrangement, and/or configuration.

In some demonstrative aspects, the plurality of analog pixel processing circuitry 120 may a binning group of two or more analog pixel processing circuitry 120 to process pixels of a pixel binning group including, for example, pixel 101 and one or more binning pixels 105, e.g., including pixel 107, as described below.

In some demonstrative aspects, the plurality of analog pixel processing circuitry 120 may include analog pixel processing circuitry 122 configured to process the analog pixel signal 111 of the pixel 101, e.g., as described below.

In some demonstrative aspects, analog pixel processing circuitry 122 may include a first input 124 to input the analog pixel signal 111 of the pixel 101 from an array line 108, e.g., as described below.

In some demonstrative aspects, analog pixel processing circuitry 122 may include SH circuitry 126 configured to provide an analog sample 127 of the pixel 101, for example, based on the analog pixel signal 111, e.g., as described below.

In some demonstrative aspects, analog pixel processing circuitry 122 may include one or more second inputs 128 to input analog samples 129 of one or more binning pixels 105, respectively, e.g., as described below.

In one example, the binning pixels 105 may include pixel 107 and/or any one or more other pixels of pixel array 102.

In some demonstrative aspects, analog pixel processing circuitry 122 may include a plurality of capacitors 130 having capacitor outputs 131 connected to a common output terminal 134, e.g., as described below.

In some demonstrative aspects, the plurality of capacitors 130 may include a plurality of capacitors having a same capacity, e.g., as described below.

In other aspects, plurality of capacitors 130 may include at least one first capacitor having a first capacity and at least one second capacitor having a second capacity, e.g., different from the first capacity.

In some demonstrative aspects, a capacitor input of a first capacitor 132 may be connected to an input terminal 135 to input the analog sample 127 of the pixel 101 from the SH circuitry 126, e.g., as described below.

In some demonstrative aspects, capacitor inputs of one or more second capacitors 136 may be connected to the one or more second inputs 128, respectively, e.g., as described below.

In some demonstrative aspects, analog pixel processing circuitry 122 may include an amplifier 150 configured to provide an amplified analog signal 152, for example, by amplifying an analog signal 156 from the common output terminal 134, e.g., as described below.

In some demonstrative aspects, analog pixel processing circuitry 122 may be switchable between a first mode and a second mode, e.g., as described below.

In some demonstrative aspects, the first mode may include a non-binning mode, e.g., as described below.

In some demonstrative aspects, the first mode may be configured to provide the analog signal 156 at the common output terminal 134, for example, based on the analog sample 127 of the pixel 101, e.g., as described below.

In some demonstrative aspects, the second mode may include a binning mode, e.g., as described below.

In some demonstrative aspects, the second mode may be configured to provide at the common output terminal 134 the analog signal 156 including an analog binning signal based on binning of the analog sample 127 of the pixel 101 and the analog samples 129 of the one or more binning pixels 105, e.g., as described below.

In some demonstrative aspects, analog pixel processing circuitry 122 may include a switchable connector 142, which may be configured to connect the capacitor inputs of the one or more second capacitors 136 to the input terminal 135, for example, at the first mode, e.g., as described below.

In some demonstrative aspects, switchable connector 142 may be configured to disconnect the capacitor inputs of the one or more second capacitors 136 from the input terminal 135, for example, at the second mode, e.g., as described below.

In some demonstrative aspects, sensor device 100 may include a controller 170 configured to switch the analog pixel processing circuitry 122 between the first mode and the second mode, for example, based on a processing mode to process pixel data of pixel array 102, e.g., as described below.

In one example, controller 170 may be configured to set the switchable connector 142 to the first mode, for example, based on a binning processing mode of sensor device 100.

In another example, controller 170 may be configured to set the switchable connector 142 to the second mode, for example, based on a non-binning processing mode of sensor device 100.

In some demonstrative aspects, analog pixel processing circuitry 122 may include a pixel sample output 158 configured to provide the analog sample 127 of the pixel 101, for example, as a binning pixel to one or more other analog pixel processing circuitry, e.g., as described below.

In some demonstrative aspects, analog pixel processing circuitry 122 may include an output switch 137 configured to switch between connecting the pixel sample output 158 to the input terminal 135, and disconnecting the sample output 158 from the input terminal 135, e.g., as described below.

For example, controller 170 may be configured to set the output switch 137 to connect the pixel sample output 158 to the input terminal 135, for example, when the analog sample 127 of the pixel 101 is to be provided as a binning pixel to one or more other analog pixel processing circuitry, e.g., as described below.

For example, controller 170 may be configured to set the output switch 137 to disconnect the pixel sample output 158 from the input terminal 135, for example, when the analog sample 127 of the pixel 101 is not to be provided as a binning pixel to one or more other analog pixel processing circuitry, e.g., as described below.

In some demonstrative aspects, analog pixel processing circuitry 122 may include a feedback capacitor 162, which may be connected, e.g., in parallel to the amplifier 150, for example, between the common output terminal 134 and an output of the amplifier 150, e.g., as described below.

In some demonstrative aspects, a gain of the amplifier 150 may be based, for example, on a capacity of the feedback capacitor 162 and capacities of the plurality of capacitors 130, e.g., as described below.

In some demonstrative aspects, first pixel processing circuitry of the plurality of analog pixel processing circuitry 120, e.g., analog pixel processing circuitry 122, may be configured to process a first analog pixel signal of a first pixel, e.g., the analog pixel signal 111 of pixel 101, and analog samples of one or more first binning pixels, e.g., the one or more binning pixels 105, e.g., as described above.

In some demonstrative aspects, second pixel processing circuitry of the plurality of analog pixel processing circuitry 120, e.g., analog pixel processing circuitry 123, may be configured to process a second analog pixel signal of a second pixel, e.g., the analog pixel signal 117 of pixel 107, and analog samples of one or more second binning pixels, e.g., as described below.

In some demonstrative aspects, analog pixel processing circuitry 122 and analog pixel processing circuitry 123 may be configured to share one or more pixels for binning, e.g., as described below.

In some demonstrative aspects, the one or more first binning pixels 105 for the analog pixel processing circuitry 122 may include the second pixel 107, e.g., as described above.

In some demonstrative aspects, the one or more second binning pixels for the analog pixel processing circuitry 123 may include the first pixel 101, e.g., as described below.

In other aspects, the first analog pixel processing circuitry 122 may utilize a binning pixel from the second analog pixel processing circuitry 123, e.g., pixel 107, while the second analog pixel processing circuitry 123 may not utilize a binning pixel from the first analog pixel processing circuitry 122, e.g., pixel 101.

In some demonstrative aspects, controller 170 may be configured to switch on an amplifier of a particular analog pixel processing circuitry 120, for example, when the particular analog pixel processing circuitry 120 is to be operated at a binning mode, e.g., as described below.

In some demonstrative aspects, controller 170 may be configured to switch off the amplifier of the particular analog pixel processing circuitry 120, for example, when the particular analog pixel processing circuitry 120 is to be operated at a non-binning mode, e.g., as described below.

For example, controller 170 may be configured to switch on the amplifier 150 of the analog pixel processing circuitry 122, for example, when analog pixel processing circuitry 122 is to be operated at the binning mode, and/or to switch off the amplifier 150 of the analog pixel processing circuitry 122, for example, when analog pixel processing circuitry 122 is to be operated at the non-binning mode.

In some demonstrative aspects, controller 170 may be configured to switch on an amplifier of a first analog pixel processing circuitry 120, for example, when the first analog pixel processing circuitry 120 is to be operated at a binning mode, e.g., as described below.

In some demonstrative aspects, controller 170 may be configured to switch off amplifiers of one or more second analog pixel processing circuitry 120 to provide one or more first binning pixels to the first analog pixel processing circuitry 120, e.g., as described below.

In one example, controller 170 may be configured to switch on amplifier 150, for example, when analog pixel processing circuitry 122 is to be operated at the binning mode.

In one example, controller 170 may be configured to switch off amplifiers of one or more analog pixel processing circuitry, e.g., an amplifier 155 of analog pixel processing circuitry 123, to provide the binning pixels 105 to analog pixel processing circuitry 122, for example, when analog pixel processing circuitry 122 is to be operated at the binning mode, e.g., as described below.

In some demonstrative aspects, controller 170 may be configured to selectively switch on and/or switch off amplifiers of the analog pixel processing circuitry 120, for example, to provide a technical solution to support reduced power consumption, for example, by selectively activating an amplifier in a binning group, e.g., a single amplifier in a binning group.

For example, controller 170 may be configured to selectively switch on the amplifier 150 of the analog pixel processing circuitry 122, for example, when analog pixel processing circuitry 122 is to be operated at the binning mode based on binning of pixels in a binning group including the pixel 101. According to this example, controller 170 may be configured to selectively switch off amplifiers of one or more other analog pixel processing circuitry, e.g., some or even all of the other analog pixel processing circuitry, corresponding to other pixels in the binning group.

In one example, a binning group may include two pixels, e.g., pixels 101 and 107. According to this example, controller 170 may be configured to selectively switch on an amplifier of an analog pixel processing circuitry 120 corresponding to a pixel in the binning group, e.g., amplifier 150 of analog processing circuitry 122 corresponding to pixel 101; and to selectively switch off amplifiers of another analog pixel processing circuitry 120 corresponding to another pixel in the binning group, e.g., amplifier 155 of analog processing circuitry 123 corresponding to pixel 107. According to this example, the power consumption may be reduced by about ½=50%, e.g., compared to an implementation where amplifiers of analog pixel processing circuitry 120 corresponding to both pixels in the binning group are maintained active.

In another example, a binning group may include four pixels. According to this example, controller 170 may be configured to selectively switch on an amplifier of an analog pixel processing circuitry 120 corresponding to a pixel in the binning group, and to selectively switch off amplifiers of up to three other analog pixel processing circuitry 120 corresponding to other pixels in the binning group. According to this example, the power consumption may be reduced by up to about ¾=75%, e.g., compared to an implementation where amplifiers of analog pixel processing circuitry 120 corresponding to all the pixels in the binning group are maintained active.

In another example, a binning group may include eight pixels. According to this example, controller 170 may be configured to selectively switch on an amplifier of an analog pixel processing circuitry 120 corresponding to a pixel in the binning group, and to selectively switch off amplifiers of up to seven other analog pixel processing circuitry 120 corresponding to other pixels in the binning group. According to this example, the power consumption may be reduced by up to about ⅞=87.5%, e.g., compared to an implementation where amplifiers of analog pixel processing circuitry 120 corresponding to all the pixels in the binning group are maintained active.

In some demonstrative aspects, the analog pixel processing circuitry 122 may be configured to receive the analog pixel signal 111 of the pixel 101 and the one or more analog samples 129 of the one or more binning pixels 105 at a same SH phase, e.g., as described below.

In some demonstrative aspects, controller 170 may be configured to control the analog pixel processing circuitry 120 corresponding to pixels in a pixel binning group to provide analog pixel signals of the pixels at a same time phase, e.g., a same SH phase, for example, such that binning of the pixels in a pixel binning group may be performed during the same SH phase.

For example, controller 170 may be configured to control the analog pixel processing circuitry 123 to provide to the analog pixel processing circuitry 123 an analog pixel signal 129 corresponding to pixel 107, for example, during a same SH phase, in which the analog pixel processing circuitry 122 is to provide the analog pixel signal 127 corresponding to pixel 101. According to this example, the analog signal 156 at the common output terminal 134 may be based on binning of the pixels 101 and 107, e.g., at the same SH phase.

In some demonstrative aspects, the analog pixel processing circuitry 120 may be configured to provide a technical solution to support pixel binning based on analog pixel signals after SH. Accordingly, the analog pixel processing circuitry 120 may be implemented to provide a technical solution to support pixel binning, for example, while avoiding additional parasitic capacitance inside pixel circuitry, e.g., inside pixel array 102. Accordingly, the analog pixel processing circuitry 120 may be implemented to provide a technical solution to support pixel binning, for example, while avoiding degradation in a pixel light sensitivity of the plurality of pixels 104.

Figure 2:
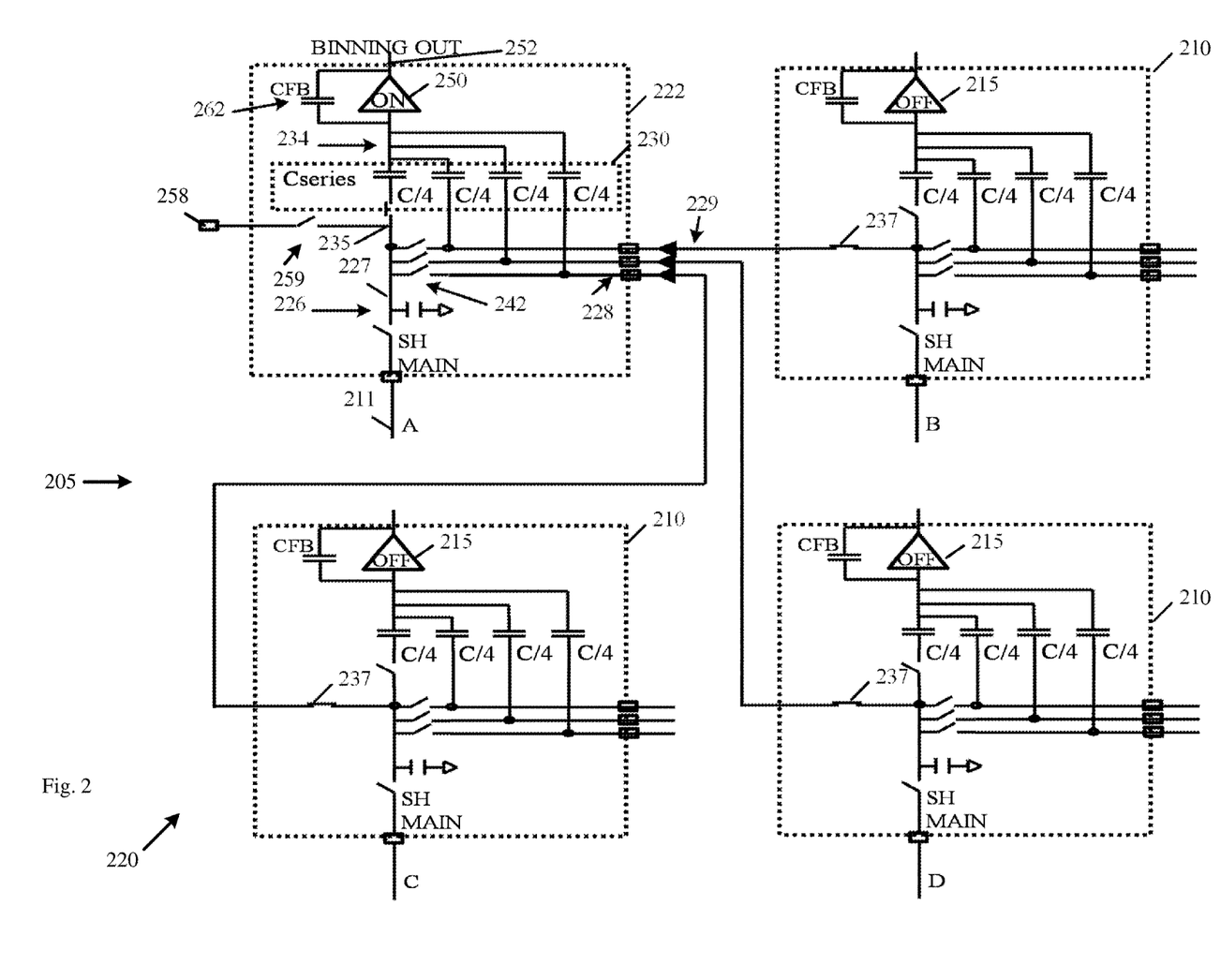
FIG. 2 is a schematic illustration of a plurality of analog pixel processing circuitry at a binning mode, in accordance with some demonstrative aspects.

Reference is made to FIG. 2, which schematically illustrates a plurality of analog pixel processing circuitry 220 at a binning mode, in accordance with some demonstrative aspects. For example, the plurality of analog pixel processing circuitry 120 (FIG. 1) may include one or more elements of the plurality analog pixel processing circuitry 220, and/or may perform one or more operations and/or functionalities of the plurality of analog pixel processing circuitry 220.

In some demonstrative aspects, the plurality of analog pixel processing circuitry 220 may be configured to process pixel signals of a plurality of binning pixels, e.g., pixels of pixel array 102 (FIG. 1).

In some demonstrative aspects, the plurality of analog pixel processing circuitry 220 may be configured to form, or may be part of, a pixel binning group 205, which may be configured to perform pixel binning for a group of binning pixels, e.g., as described below.

In some demonstrative aspects, the binning group 205 may be configured to provide binning of the plurality of pixels.

In some demonstrative aspects, the binning group 205 may be configured to output an average, e.g., an arithmetic average, a weighted average, and/or any other average or combination, of pixel data of the plurality of binning pixels in the group of binning pixels.

In some demonstrative aspects, as shown in FIG. 2, the binning group 205 may include four analog pixel processing circuitry 220 to process pixel signals corresponding to four respective pixels, e.g., in a group of four binning pixels.

In other aspects, the binning group 205 may include any other number of analog pixel processing circuitry 220 to process pixel signals corresponding to any other number of respective pixels.

In some demonstrative aspects, one or more analog pixel processing circuitry 220 of the binning group 205 may be operable at the binning mode as binning circuitry ("engine circuitry'), which may be configured to perform the binning of the binning pixels in the group of binning pixels, and to output a binning signal based on analog samples of the binning pixels.

In some demonstrative aspects, one or more analog pixel processing circuitry 220 of the binning group 205 may be operable at the binning mode as binning pixel providers ('wagon circuitry'), which may be configured to provide analog samples of the binning pixels to the engine circuitry, e.g., as described below.

In some demonstrative aspects, as shown in FIG. 2, binning group 205 may include analog pixel processing circuitry 222 operable as the engine circuitry to output an amplified binning signal 252, e.g., at the binning mode. For example, analog pixel processing circuitry 122 (FIG. 1) may include one or more elements of analog pixel processing circuitry 222, and/or may perform one or more operations and/or functionalities of analog pixel processing circuitry 222.

In some demonstrative aspects, as shown in FIG. 2, binning group 205 may include three analog pixel processing circuitry 210 operable as the wagon circuitry to provide to the engine circuitry analog samples 229 of three binning pixels, respectively, e.g., at the binning mode.

In other aspects, the plurality of analog pixel processing circuitry 220 may include any other number of analog pixel processing circuitry 210 to provide any other respective number of binning pixels to the engine processing circuitry 222.

In some demonstrative aspects, analog pixel processing circuitry 222 may be configured to generate the amplified binning signal 252 based, for example, on binning of four binning pixels of the four analog pixel processing circuitry 220. For example, analog pixel processing circuitry 222 may be configured to generate the amplified binning signal 252 based on binning of the plurality of analog samples 229 and an analog sample 227 of an analog pixel signal 211 of a pixel.

In some demonstrative aspects, as shown in FIG. 2, analog pixel processing circuitry 222 may include a plurality of capacitors 230 having capacitor outputs connected to a common output terminal 234.

In some demonstrative aspects, as shown in FIG. 2, a count of the plurality of capacitors 230 may be equal to a count of the plurality of analog pixel processing circuitry 220 in the binning group 205. For example, the plurality of capacitors 230 may include four capacitors.

In some demonstrative aspects, as shown in FIG. 2, a capacitor of capacitors 230 may be connected to an input terminal 235 to input the analog sample 227 of the pixel from SH circuitry 226. For example, SH circuitry 226 may be configured to generate the analog sample 227 based on the analog pixel signal 211.

In some demonstrative aspects, as shown in FIG. 2, three capacitors of capacitors 230 may be connected to three respective inputs 228, for example, to input the analog samples 229 of the binning pixels from the three wagon circuitry 210.

In some demonstrative aspects, as shown in FIG. 2, analog pixel processing circuitry 222 may include a switchable connector 242 which may be set, e.g., by controller 170 (FIG. 1), to disconnect capacitor inputs of the three capacitors from the input terminal 235.

In some demonstrative aspects, a controller, e.g., controller 170 (FIG. 1), may be configured to switch on an amplifier 250 of analog pixel processing circuitry 220, for example, to provide the amplified binning signal 252.

In some demonstrative aspects, a controller, e.g., controller 170 (FIG. 1), may be configured to switch off amplifiers 215 of the analog pixel processing circuitry 210, which may provide the analog samples 229 of the three binning pixels.

In some demonstrative aspects, as shown in FIG. 2, analog pixel processing circuitry 222 may include a pixel sample output 258 to provide the analog sample 227 as a binning pixel to other analog pixel processing circuitry.

In some demonstrative aspects, as shown in FIG. 2, analog pixel processing circuitry 222 may include an output switch 259, which may be switched, e.g., by controller 170 (FIG. 1), between a first state for connecting the pixel sample output 258 to the input terminal 235, e.g., when the analog sample 227 is to be provided as a binning pixel to other analog pixel processing circuitry; and a second state for disconnecting the sample output 258 from the input terminal 235, e.g., when the analog sample 227 is not to be provided as a binning pixel to other analog pixel processing circuitry.

In some demonstrative aspects, as shown in FIG. 2, analog pixel processing circuitry 222 may include a feedback capacitor 262 connected, in parallel to the amplifier 250, between the common output terminal 234 and an output of the amplifier 250.

In some demonstrative aspects, an input capacity, denoted Cin, resulting from the capacitors 230 may be based on a sum of capacities of the plurality of capacitors 230.

In some demonstrative aspects, as shown in FIG. 2, the plurality of capacitors 230 may have a same capacity, e.g., C/4. Accordingly, each analog sample of the analog samples 227 and 229 may be connected to a different capacitor 230, which may contribute a quarter of the capacitance, e.g., C/4, to the input capacity Cin.

In some demonstrative aspects, the plurality of capacitors 230 may include two or more capacitors having different capacitances. For example, a first capacitor 230 may have a first capacitance, and a second capacitor 230 may have a second capacitance, e.g., different from the first capacitance. In one example, each of the capacitors 230 may have a different capacitance. In another example, some of the capacitors 230 may have a same capacitance, while one or more other capacitors 230 may have different capacitances.

For example, analog sample 227 may be applied to a first capacitor 230 having a first capacitance, a first analog sample 229 may be applied to a second capacitor 230 having a second capacitance, a second analog sample 229 may be applied to a third capacitor 230 having a third capacitance, and/or a third analog sample 229 may be applied to a fourth capacitor 230 having a fourth capacitance. The first, second, third and/or fourth capacitances may be equal to each other, or different from one another. For example, the first, second, third and/or fourth capacitances may contribute to respective portions of the capacitance, e.g., to the input capacity Cin.

For example, a sum of capacitances of the plurality of capacitors 230 may be equal to the input capacity Cin. In one example, the amplified binning signal 252 may be based on an arithmetic average of the capacitances of the plurality of capacitors 230, e.g., when the first, second, third and/or fourth capacitances are equal to one another. In another example, the amplified binning signal 252 may be based on a weighted average of the capacitances of the plurality of capacitors 230, e.g., when the first, second, third and/or fourth capacitances include different capacitances.

In some demonstrative aspects, a gain of the amplifier 250, e.g., an active amplifier closed loop gain, may be based on a capacity of the feedback capacitor 262, e.g., denoted CFeedback, and on the input capacity Cin, e.g., gain=−CFeedBack/Cin.

In some demonstrative aspects, as shown in FIG. 2, signal sampling and binning averaging of the binning group 205 may be performed at a same phase, e.g., at a same SH phase, for example, as the analog samples, e.g., analog samples 229 and analog sample 227, are connected to different capacitors 230.

In some demonstrative aspects, a controller, e.g., controller 170 (FIG. 1), may be configured to switch the plurality of analog pixel processing circuitry of the binning group 205 to the binning mode, for example, by controlling switchable connector 242 to be at an open state to disconnect capacitor inputs of the three capacitors from the common input terminal 235, and controlling input switches 237 to be at a closed state to provide analog samples 229 from the three analog pixel processing circuitry 210 to the inputs 228.

In some demonstrative aspects, a controller, e.g., controller 170, may be configured to switch relevant binning mode switches, e.g., to switch switchable connector 242 to an open state, and/or switching input switches 237 to a closed state, for example, based on selection of the binning mode; and/or to switch back the relevant binning mode switches, e.g., to switch switchable connector 242 to a closed state, and/or switching input switches 237 to an open state, for example, based on selection of a non-binning mode, e.g., a normal mode, as described below.

Figure 3:
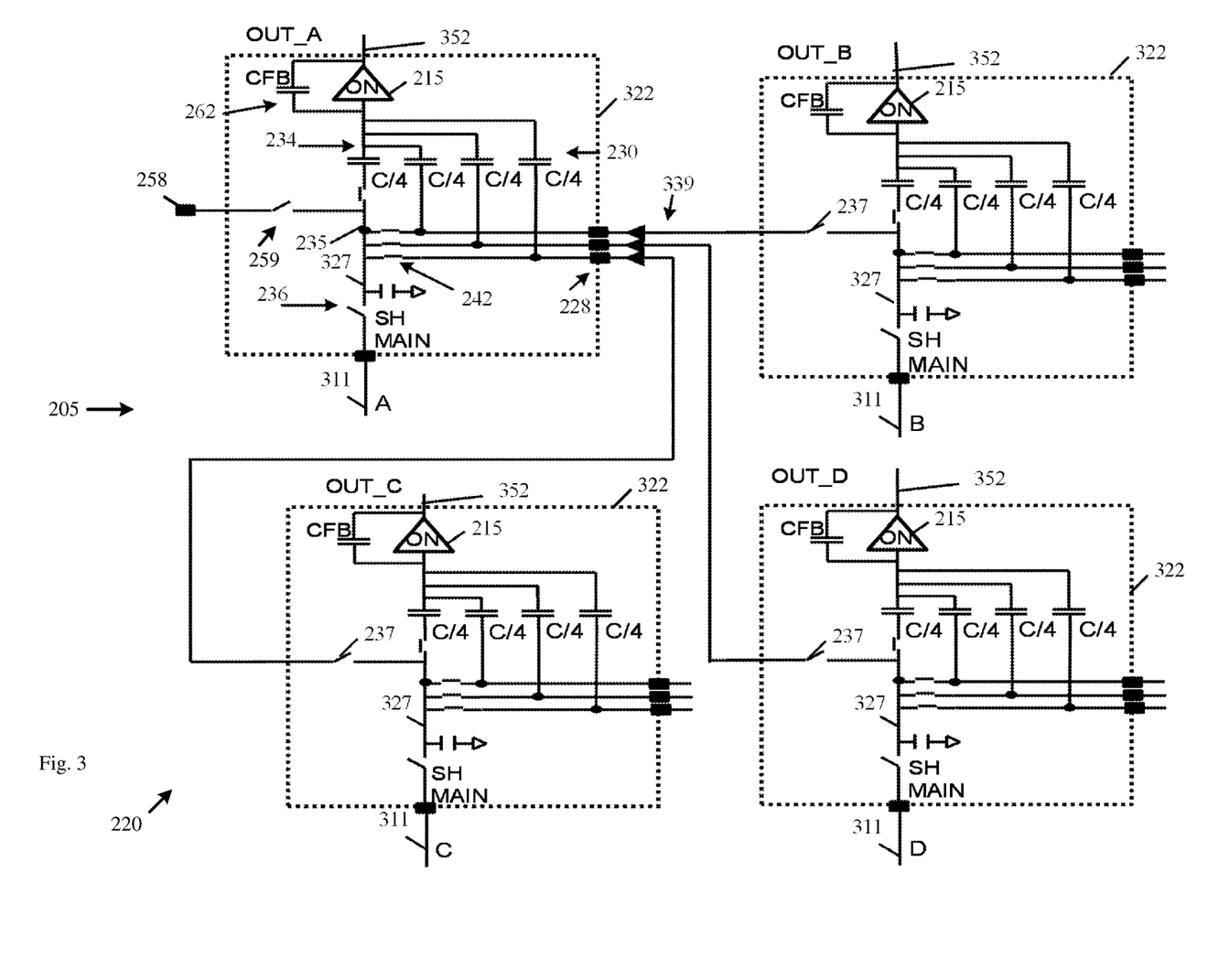
FIG. 3 is a schematic illustration of the plurality of analog pixel processing circuitry of FIG. 2 at a non-binning mode, in accordance with some demonstrative aspects.

Reference is made to FIG. 3, which schematically illustrates the plurality of analog pixel processing circuitry 220 at a non-binning mode, in accordance with some demonstrative aspects.

In some demonstrative aspects, as shown in FIG. 3, an analog pixel processing circuitry 220, e.g., each of the analog pixel processing circuitry 220, may be operated, at the non-binning mode, as non-binning pixel processing circuitry 322 configured to output an amplified signal 352 based on an analog sample 327 of a respective input analog pixel signal 311 of a pixel. For example, the plurality of analog pixel processing circuitry 120 (FIG. 1) may include one or more elements of the non-binning pixel processing circuitry 322 at the non-binning mode, and/or may perform one or more operations and/or functionalities of the non-binning pixel processing circuitry 322 at the non-binning mode.

In some demonstrative aspects, a controller, e.g., controller 170 (FIG. 1), may be configured to switch on amplifiers 215 of the plurality of analog pixel processing circuitry 220, for example, to provide a plurality of amplified signals 352, respectively.

In some demonstrative aspects, as shown in FIG. 3, a controller, e.g., controller 170 (FIG. 1), may be configured to set the output connectors 237 and 259 to an open state, for example, to disconnect between an SH output 327 of a non-binning pixel processing circuitry 322 and an input 228 of another non-binning pixel processing circuitry 322, for example, when the SH output 327 of the non-binning pixel processing circuitry 322 is not to be provided as aa binning pixel input to other analog pixel processing circuitry.

In some demonstrative aspects, as shown in FIG. 3, a controller, e.g., controller 170 (FIG. 1), may be configured to set the switchable connector 242 to a closed state, for example, to connect capacitor inputs of the plurality of capacitors 230 in non-binning pixel processing circuitry 322 to the common input terminal 235.

In some demonstrative aspects, as shown in FIG. 3, the plurality of capacitors 230 may be connected in parallel, e.g., between common output terminal 234 and common input terminal 235, for example, when the switchable connector 242 is at the closed state.

In some demonstrative aspects, as the plurality of capacitors 230 of the non-binning pixel processing circuitry 322 may be connected in parallel, a capacitor 230, e.g., each capacitor 230, may contribute a part to the input capacity Cin, e.g., based on a capacitance of the capacitor relative to capacitances of other capacitors 230. Accordingly, the input capacity Cin may be equal to a sum of the capacitances of the capacitors 230.

In some demonstrative aspects, as shown in FIG. 3, the first, second, third and/or fourth capacitances of the capacitors 230 may be equal to each other. For example, as the plurality of capacitors 230 of the non-binning pixel processing circuitry 322 may be connected in parallel, each capacitor 230 may contribute a quarter, e.g., C/4, to the input capacity Cin. Accordingly, the input capacity Cin may be equal to C, e.g., Cin=4*C/4=C.

In some demonstrative aspects, a gain of the amplifier 215, e.g., an active amplifier closed loop gain, may be based on a capacity of the feedback capacitor 262, and the input capacity Cin, e.g., gain=−CFeedBack/Cin.

In some demonstrative aspects, the plurality of non-binning pixel processing circuitry 322 may be configured to provide a full resolution of pixels processed by the non-binning pixel processing circuitry 322. In one example, a full resolution of pixels of a pixel array may be achieved, for example, by operating the non-binning pixel processing circuitry 322 to process pixels of a full array without binning.

In some demonstrative aspects, as shown in FIG. 2 and FIG. 3, the binning group 205 may be switched from the non-binning mode to the binning mode, for example, by controlling the connector 242 of the analog pixel processing circuitry 222 to connect three of the four capacitors 230 to process analog samples of binning pixels from the three other analog pixel processing circuitry 210, e.g., as described above.

Figure 4:
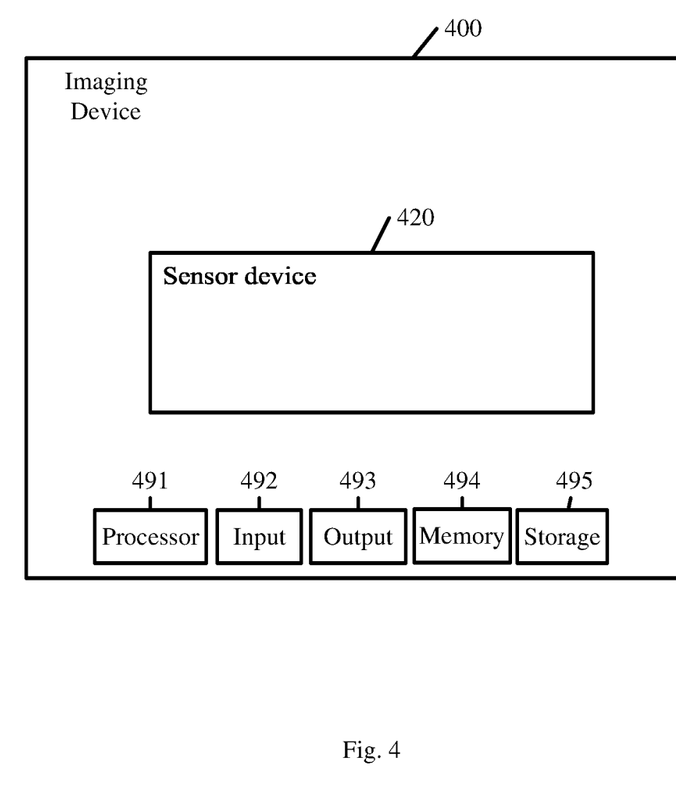
FIG. 4 is a schematic illustration of an imaging device, in accordance with some demonstrative aspects.

Reference is made to FIG. 4, which schematically illustrates an imaging device 400, in accordance with some demonstrative aspects.

In some demonstrative aspects, imagine device 400 may be configured to capture one or more images.

In one example, imagine device 400 may capture, record, process, handle and/or store one or more photos, videos, movies, clips and/or the like.

In some demonstrative aspects, imagine device 400 may include a camera, e.g., a digital camera, a digital video camera, a digital photo camera, a webcam, a mobile device, an imaging device, a medical imaging device, a mobile phone, e.g., including a camera, a Smartphone, and/or the like.

In some demonstrative aspects, imaging device 400 may include a sensor device 420. For example, sensor device 420 may include sensor device 100 (FIG. 1).

In some demonstrative aspects, sensor device 420 may be configured to capture the one or more images, for example, by converting incoming photons into electronic signals.

In some demonstrative aspects, imaging device 400 may also include, for example, a processor 491, an input unit 492, an output unit 493, a memory unit 494, and/or a storage unit 495. Imaging device 400 may optionally include other suitable hardware components and/or software components. In some demonstrative aspects, some or all of the components of imaging device 400 may be enclosed in a common housing or packaging, and may be interconnected or operably associated using one or more wired or wireless links. In other aspects, components of image sensing device 400 may be distributed among multiple or separate devices.

In some demonstrative aspects, processor 491 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 491 executes instructions, for example, of an Operating System (OS) of imaging device 400 and/or of one or more suitable applications.

In some demonstrative aspects, memory unit 494 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 495 may include, for example, a hard disk drive, a Solid State Drive (SSD), or other suitable removable or non-removable storage units. For example, memory unit 494 and/or storage unit 495, for example, may store data processed by imaging device 400.

In some demonstrative aspects, input unit 492 may include, for example, a keyboard, a keypad, a mouse, a touch-screen, a touch-pad, a track-ball, a stylus, a microphone, or other suitable pointing device or input device. Output unit 493 includes, for example, a monitor, a screen, a touch-screen, a flat panel display, a Light Emitting Diode (LED) display unit, an Organic LED (OLED) display unit, a Liquid Crystal Display (LCD) display unit, a plasma display unit, one or more audio speakers or earphones, or other suitable output devices.

EXAMPLES

The following examples pertain to further aspects.

Example 1 includes an apparatus comprising analog pixel processing circuitry configured to process an analog pixel signal of a pixel, the analog pixel processing circuitry comprising a first input to input the analog pixel signal of the pixel; Sample and Hold (SH) circuitry configured to provide an analog sample of the pixel based on the analog pixel signal; one or more second inputs to input analog samples of one or more binning pixels, respectively; a plurality of capacitors having capacitor outputs connected to a common output terminal, wherein a capacitor input of a first capacitor is connected to an input terminal to input the analog sample of the pixel from the SH circuitry, wherein capacitor inputs of one or more second capacitors are connected to the one or more second inputs, respectively; and an amplifier configured to provide an amplified analog signal by amplifying an analog signal from the common output terminal.

Example 2 includes the subject matter of Example 1, and optionally, wherein the analog pixel processing circuitry is switchable between a first mode and a second mode, wherein the first mode is configured to provide the analog signal at the common output terminal based on the analog sample of the pixel, wherein the second mode is configured to provide at the common output terminal the analog signal comprising an analog binning signal based on binning of the analog sample of the pixel and the analog samples of the one or more binning pixels.

Example 3 includes the subject matter of Example 2, and optionally, comprising a switchable connector configured to connect the capacitor inputs of the one or more second capacitors to the input terminal at the first mode, and to disconnect the capacitor inputs of the one or more second capacitors from the input terminal at the second mode.

Example 4 includes the subject matter of Example 2 or 3, and optionally, comprising a controller configured to switch the analog pixel processing circuitry between the first mode and the second mode based on a processing mode to process pixel data of a pixel array.

Example 5 includes the subject matter of any one of Examples 1-4, and optionally, comprising a pixel sample output to provide the analog sample of the pixel as a binning pixel to other analog pixel processing circuitry.

Example 6 includes the subject matter of Example 5, and optionally, comprising an output switch to switch between connecting the pixel sample output to the input terminal and disconnecting the sample output from the input terminal.

Example 7 includes the subject matter of any one of Examples 1-6, and optionally, comprising a feedback capacitor connected, in parallel to the amplifier, between the common output terminal and an output of the amplifier, wherein a gain of the amplifier is based on a capacity of the feedback capacitor and capacities of the plurality of capacitors.

Example 8 includes the subject matter of any one of Examples 1-7, and optionally, comprising a plurality of analog pixel processing circuitry to process analog pixel signals of a respective plurality of pixels, wherein the plurality of analog pixel processing circuitry comprises first pixel processing circuitry and second pixel processing circuitry, wherein the first pixel processing circuitry is configured to process a first analog pixel signal of a first pixel and analog samples of one or more first binning pixels, and wherein the second pixel processing circuitry is configured to process a second analog pixel signal of a second pixel and analog samples of one or more second binning pixels, wherein the one or more first binning pixels comprises the second pixel.

Example 9 includes the subject matter of Example 8, and optionally, comprising a controller configured to switch on an amplifier of a particular analog pixel processing circuitry, when the particular analog pixel processing circuitry is to be operated at a binning mode, and to switch off the amplifier of the particular analog pixel processing circuitry, when the particular analog pixel processing circuitry is to be operated at a non-binning mode.

Example 10 includes the subject matter of Example 8 or 9, and optionally, comprising a controller configured to, when the first analog pixel processing circuitry is to be operated at a binning mode, switch on an amplifier of the first analog pixel processing circuitry, and switch off amplifiers of one or more analog pixel processing circuitry to provide the one or more first binning pixels.

Example 11 includes the subject matter of any one of Examples 8-10, and optionally, wherein the one or more second binning pixels comprise the first pixel.

Example 12 includes the subject matter of any one of Examples 1-11, and optionally, wherein the plurality of capacitors comprises a plurality of capacitors having a same capacity.

Example 13 includes the subject matter of any one of Examples 1-12, and optionally, wherein the analog pixel processing circuitry is configured to receive the analog pixel signal of the pixel and the one or more analog samples of the one or more binning pixels at a same SH phase.

Example 14 includes the subject matter of any one of Examples 1-13, and optionally, comprising a sensor device, the sensor device comprising a pixel array comprising a plurality of pixels; and a plurality of array lines to connect the plurality of pixels to a plurality of analog pixel processing circuitry.

Example 15 includes a device comprising a sensor to provide sensor information, the sensor comprising a pixel array comprising a plurality of pixels; and a plurality of analog pixel processing circuitry, wherein an analog pixel processing circuitry is configured to process an analog pixel signal of a pixel of the plurality of pixels, the analog pixel processing circuitry comprising a first input to input the analog pixel signal of the pixel; Sample and Hold (SH) circuitry configured to provide an analog sample of the pixel based on the analog pixel signal; one or more second inputs to input analog samples of one or more binning pixels, respectively; a plurality of capacitors having capacitor outputs connected to a common output terminal, wherein a capacitor input of a first capacitor is connected to an input terminal to input the analog sample of the pixel from the SH circuitry, wherein capacitor inputs of one or more second capacitors are connected to the one or more second inputs, respectively; and an amplifier configured to provide an amplified analog signal by amplifying an analog signal from the common output terminal; a processor to process the sensor information; and a memory to store information processed by the processor.

Example 16 includes the device of Example 15, and optionally, including the apparatus of any one of Examples 1-14.

Example 17 includes an apparatus comprising means for executing any of the described operations of any of Examples 1-16.

Example 18 includes circuitry configured to perform any of the described operations of any of Examples 1-16.

Example 19 includes a method including any of the described operations of any of Examples 1-16.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
analog pixel processing circuitry configured to process an analog pixel signal of a pixel, the analog pixel processing circuitry comprising:
a first input to input the analog pixel signal of the pixel;
Sample and Hold (SH) circuitry configured to provide an analog sample of the pixel based on the analog pixel signal;
one or more second inputs to input analog samples of one or more binning pixels, respectively;
a plurality of capacitors having capacitor output terminals connected to a common output terminal, wherein a capacitor input terminal of a first capacitor of the plurality of capacitors is connected to an input terminal to input the analog sample of the pixel from the SH circuitry, wherein capacitor input terminals of one or more second capacitors of the plurality of capacitors are connected to the one or more second inputs, respectively;
a switchable connector switchable between a first state and a second state, wherein at the first state the switchable connector is to connect the capacitor input terminals of the one or more second capacitors to the input terminal such that the plurality of capacitors are to be connected in parallel between the input terminal and the common output terminal, wherein at the second state the switchable connector is to disconnect the capacitor input terminals of the one or more second capacitors from the input terminal; and
an amplifier configured to provide an amplified analog signal by amplifying an analog signal from the common output terminal.

2. The apparatus of claim 1, wherein the analog pixel processing circuitry is switchable between a first mode and a second mode, wherein the first mode is configured to provide the analog signal at the common output terminal based on the analog sample of the pixel, wherein the second mode is configured to provide at the common output terminal the analog signal comprising an analog binning signal based on binning of the analog sample of the pixel and the analog samples of the one or more binning pixels.

3. The apparatus of claim 2 comprising a controller to switch the switchable connector to be at the first state at the first mode, and at the second state at the second mode.

4. The apparatus of claim 2 comprising a controller configured to switch the analog pixel processing circuitry between the first mode and the second mode based on a processing mode to process pixel data of a pixel array.

5. The apparatus of claim 1 comprising a pixel sample output to provide the analog sample of the pixel as a binning pixel to other analog pixel processing circuitry.

6. The apparatus of claim 5 comprising an output switch to switch between connecting the pixel sample output to the input terminal and disconnecting the pixel sample output from the input terminal.

7. The apparatus of claim 1 comprising a feedback capacitor connected, in parallel to the amplifier, between the common output terminal and an output of the amplifier, wherein a gain of the amplifier is based on a capacity of the feedback capacitor and capacities of the plurality of capacitors.

8. The apparatus of claim 1 comprising a plurality of analog pixel processing circuitry to process analog pixel signals of a respective plurality of pixels, wherein the plurality of analog pixel processing circuitry comprises first analog pixel processing circuitry and second analog pixel processing circuitry, wherein the first analog pixel processing circuitry is configured to process a first analog pixel signal of a first pixel and analog samples of one or more first binning pixels, and wherein the second analog pixel processing circuitry is configured to process a second analog pixel signal of a second pixel and analog samples of one or more second binning pixels, wherein the one or more first binning pixels comprises the second pixel.

9. The apparatus of claim 8 comprising a controller configured to switch on an amplifier of a particular analog pixel processing circuitry, when the particular analog pixel processing circuitry is to be operated at a binning mode, and to switch off the amplifier of the particular analog pixel processing circuitry, when the particular analog pixel processing circuitry is to be operated at a non-binning mode.

10. The apparatus of claim 8 comprising a controller configured to, when the first analog pixel processing circuitry is to be operated at a binning mode, switch on an amplifier of the first analog pixel processing circuitry, and switch off amplifiers of one or more analog pixel processing circuitry to provide the one or more first binning pixels.

11. The apparatus of claim 8, wherein the one or more second binning pixels comprise the first pixel.

12. The apparatus of claim 1, wherein the plurality of capacitors comprises a plurality of capacitors having a same capacity.

13. The apparatus of claim 1, wherein the analog pixel processing circuitry is configured to receive the analog pixel signal of the pixel and the analog samples of the one or more binning pixels at a same SH phase.

14. The apparatus of claim 1 comprising a sensor device, the sensor device comprising:
a pixel array comprising a plurality of pixels; and
a plurality of array lines to connect the plurality of pixels to a plurality of analog pixel processing circuitry.

15. A device comprising:
a sensor to provide sensor information, the sensor comprising:
a pixel array comprising a plurality of pixels; and
a plurality of analog pixel processing circuitry, wherein an analog pixel processing circuitry is configured to process an analog pixel signal of a pixel of the plurality of pixels, the analog pixel processing circuitry comprising:
a first input to input the analog pixel signal of the pixel;
Sample and Hold (SH) circuitry configured to provide an analog sample of the pixel based on the analog pixel signal;
one or more second inputs to input analog samples of one or more binning pixels, respectively;
a plurality of capacitors having capacitor output terminals connected to a common output terminal, wherein a capacitor input terminal of a first capacitor of the plurality of capacitors is connected to an input terminal to input the analog sample of the pixel from the SH circuitry, wherein capacitor input terminals of one or more second capacitors of the plurality of capacitors are connected to the one or more second inputs, respectively;
a switchable connector switchable between a first state and a second state, wherein at the first state the switchable connector is to connect the capacitor input terminals of the one or more second capacitors to the input terminal such that the plurality of capacitors are to be connected in parallel between the input terminal and the common output terminal, wherein at the second state the switchable connector is to disconnect the capacitor input terminals of the one or more second capacitors from the input terminal; and an amplifier configured to provide an amplified analog signal by amplifying an analog signal from the common output terminal;

a processor to process the sensor information; and a memory to store information processed by the processor.

16. The device of claim 15, wherein the analog pixel processing circuitry is switchable between a first mode and a second mode, wherein the first mode is configured to provide the analog signal at the common output terminal based on the analog sample of the pixel, wherein the second mode is configured to provide at the common output terminal the analog signal comprising an analog binning signal based on binning of the analog sample of the pixel and the analog samples of the one or more binning pixels.

17. The device of claim 15, wherein the analog pixel processing circuitry comprises a pixel sample output to provide the analog sample of the pixel as a binning pixel to other analog pixel processing circuitry.

18. The device of claim 15, wherein the analog pixel processing circuitry comprises a feedback capacitor connected, in parallel to the amplifier, between the common output terminal and an output of the amplifier, wherein a gain of the amplifier is based on a capacity of the feedback capacitor and capacities of the plurality of capacitors.

19. The device of claim 15, wherein the plurality of analog pixel processing circuitry comprises first analog pixel processing circuitry and second analog pixel processing circuitry, wherein the first analog pixel processing circuitry is configured to process a first analog pixel signal of a first pixel and analog samples of one or more first binning pixels, and wherein the second analog pixel processing circuitry is configured to process a second analog pixel signal of a second pixel and analog samples of one or more second binning pixels, wherein the one or more first binning pixels comprises the second pixel.

20. The device of claim 19 comprising a controller configured to, when the first analog pixel processing circuitry is to be operated at a binning mode, switch on an amplifier of the first analog pixel processing circuitry, and switch off amplifiers of one or more analog pixel processing circuitry to provide the one or more first binning pixels.

* * * * *